(12) United States Patent
Schultz

(10) Patent No.: US 11,543,659 B2
(45) Date of Patent: Jan. 3, 2023

(54) IMAGE LIGHT GUIDE WITH CIRCULAR POLARIZER

(71) Applicant: Vuzix Corporation, West Henrietta, NY (US)

(72) Inventor: Robert J. Schultz, Vctor, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 16/968,596

(22) PCT Filed: Jan. 28, 2019

(86) PCT No.: PCT/US2019/015420
§ 371 (c)(1),
(2) Date: Aug. 9, 2020

(87) PCT Pub. No.: WO2019/156839
PCT Pub. Date: Aug. 15, 2019

(65) Prior Publication Data
US 2020/0371281 A1 Nov. 26, 2020

Related U.S. Application Data

(60) Provisional application No. 62/628,651, filed on Feb. 9, 2018.

(51) Int. Cl.
G02B 27/01 (2006.01)
F21V 8/00 (2006.01)
G02B 6/27 (2006.01)

(52) U.S. Cl.
CPC ....... *G02B 27/0172* (2013.01); *G02B 6/0016* (2013.01); *G02B 6/0036* (2013.01);
(Continued)

(58) Field of Classification Search
None
See application file for complete search history.

(56) References Cited

U.S. PATENT DOCUMENTS 4,574,492 A 3/1986 Miller
5,844,530 A 12/1998 Tosaki
(Continued)

FOREIGN PATENT DOCUMENTS

CN 105934902 A 9/2016
JP H 08-160348 A 6/1996
(Continued)

OTHER PUBLICATIONS

European Patent Office, Extended European Search Report in corresponding European patent application No. 19752048.9, dated Aug. 19, 2021.
(Continued)

*Primary Examiner* — Michelle R Connelly
(74) *Attorney, Agent, or Firm* — Harter Secrest & Emery LLP; Thomas B. Ryan; Jacob D. Merrill, Esq.

(57) ABSTRACT

An imaging apparatus for conveying a virtual image superimposed within a view of an ambient environment has a waveguide having first and second surfaces. An in-coupling diffractive optic on one of the planar surfaces is disposed to direct image-bearing light beams into the waveguide. An out-coupling diffractive optic on one of the planar surfaces of the waveguide is disposed to direct the image-bearing light beams from the waveguide toward a viewer eyebox. An outer cover protects as least part of the waveguide from undesirable environmental influences of an ambient environment while supporting views of the ambient environment from the eyebox. A circular polarizer interposed between waveguide and the outer cover blocks the return of stray light into the waveguide.

18 Claims, 15 Drawing Sheets

(52) U.S. Cl.
CPC ......... *G02B 6/0056* (2013.01); *G02B 6/0075* (2013.01); *G02B 6/0093* (2013.01); *G02B 6/276* (2013.01); *G02B 6/2753* (2013.01); *G02B 6/0076* (2013.01); *G02B 2027/0118* (2013.01); *G02B 2027/0178* (2013.01); *G02B 2027/0185* (2013.01)

(56) References Cited

U.S. PATENT DOCUMENTS

| | | | |
|---|---|---|---|
| 8,548,290 | B2 | 10/2013 | Travers et al. |
| 8,848,289 | B2* | 9/2014 | Amirparviz .......... G02B 5/1876 |
| | | | 359/485.05 |
| 8,934,171 | B2 | 1/2015 | Desserouer |
| 9,013,793 | B2 | 4/2015 | Gupta et al. |
| 2008/0291120 | A1 | 11/2008 | Wu et al. |
| 2011/0004272 | A1* | 1/2011 | Seibel ....................... A61F 9/08 |
| | | | 607/54 |
| 2015/0138224 | A1 | 5/2015 | Kim et al. |
| 2015/0235431 | A1 | 8/2015 | Schowengerdt |
| 2016/0004137 | A1 | 1/2016 | Sagardoyburu |
| 2016/0278695 | A1* | 9/2016 | Wang ................... H04N 5/2257 |
| 2017/0010466 | A1* | 1/2017 | Klug .................... G02B 5/1833 |
| 2017/0045742 | A1* | 2/2017 | Greenhalgh ........ G02B 27/0081 |
| 2017/0090194 | A1* | 3/2017 | Hayes ................ G02B 27/0101 |
| 2017/0139210 | A1* | 5/2017 | Vallius ................. G02B 6/0026 |
| 2017/0184848 | A1 | 6/2017 | Vallius |
| 2017/0212352 | A1 | 7/2017 | Cobb et al. |
| 2017/0242251 | A1* | 8/2017 | Border ..................... G02B 5/30 |
| 2017/0357101 | A1 | 12/2017 | Tervo et al. |
| 2018/0143437 | A1* | 5/2018 | Kimmel ............. G02B 27/1066 |
| 2019/0179409 | A1* | 6/2019 | Jones ..................... G06F 3/011 |
| 2021/0103146 | A1* | 4/2021 | Travers .................... H04R 1/08 |

FOREIGN PATENT DOCUMENTS

| | | |
|---|---|---|
| JP | 2001-154637 A | 6/2001 |
| JP | 2014-160169 A | 9/2014 |
| JP | 2016-519322 A | 6/2016 |
| WO | 2013049248 A3 | 4/2013 |
| WO | 2017127494 A1 | 7/2017 |
| WO | 2017199232 A1 | 11/2017 |

OTHER PUBLICATIONS

China Patent Office, Office Action in corresponding CN patent application No. 201980012382.0, dated Sep. 29, 2021.

* cited by examiner

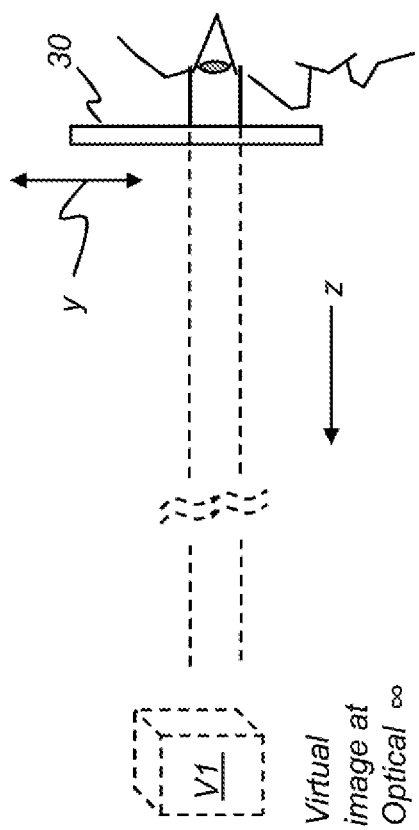
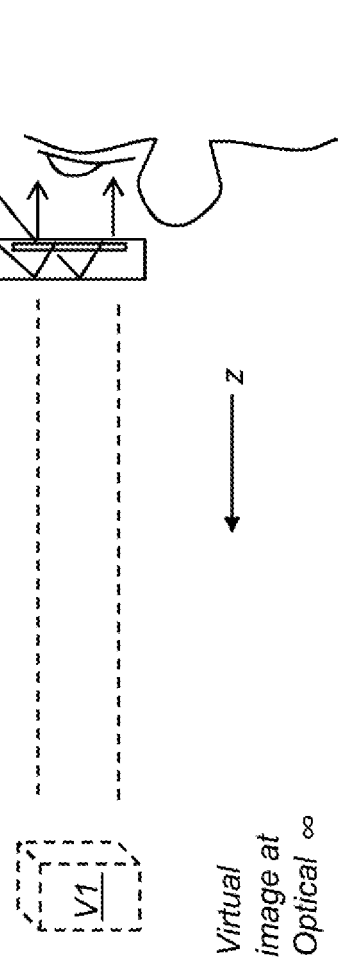

IMAGE LIGHT GUIDE WITH CIRCULAR POLARIZER

TECHNICAL FIELD

This invention generally relates to electronic displays and more particularly relates to displays that use image light guides to convey virtual image content to a viewer.

BACKGROUND OF THE INVENTION

Head-Mounted Displays (HMDs) are being developed for a range of diverse uses, including military, commercial, industrial, fire-fighting, and entertainment applications. For many of these applications, there is particular value in forming a virtual image that can be visually superimposed over the real-world image formed in the eye from within the field of view of the HMD user. Image light guides convey image-bearing light along a transmissive waveguide from a location outside the viewer's field of view to a position in alignment with the viewer's pupil while preserving the viewer's view of the environment through the waveguide.

In such conventional image light guides, collimated, relatively angularly encoded light beams from an image source are coupled into a plate-shaped waveguide by an input coupling such as an in-coupling diffractive optic, which can be mounted or formed on a surface of the plate-shaped waveguide or buried within the waveguide. Such diffractive optics can be formed as diffraction gratings, holographic optical elements or in other known ways. For example, the diffraction grating can be formed by surface relief. After propagating along the waveguide, the diffracted light can be directed back out of the waveguide by a similar output grating, which can be arranged to provide pupil expansion along one dimension of the virtual image. In addition, a turning diffractive optic can be positioned along the waveguide between the input and output gratings to provide pupil expansion in a second orthogonal dimension of the virtual image. The two dimensions of pupil expansion define expanded eyebox within which the viewer's pupil can be positioned for viewing the virtual image conveyed by the light guide.

Conventional image light guides generally form a virtual image focused at optical infinity by conveying angularly encoded light beams of collimated light to the viewer eyebox. However, there can be advantages to forming the virtual image such that it appears to be focused at some closer distance, such as in the range from 1 m to 1.5 m, for example. Using near-focused solutions can allow the viewer to have the advantage of augmented reality imaging in applications where it is useful to have the real-world scene content at a close distance.

There can be further benefits to a head-mounted optical imaging apparatus with an image light guide that forms both a conventional virtual image at infinity and another virtual image at a near distance from the viewer. In addition, the apparatus should provide good visibility of the real-world scene that lies in the viewer's field of view.

Ambient conditions including excessively bright environments can reduce the contrast of virtual images that are superimposed on such environments. Dust, chemicals, and other environmental hazards can also impair the ongoing performance of image light guides that are exposed to such conditions. Thus, a need exists to provide protection against such environmental hazards to assure the proper operation of the optics used for augmented reality applications.

SUMMARY OF THE INVENTION

Embodiments of the present disclosure advance the art of virtual image presentation when using compact head-mounted devices and similar imaging apparatus. For example, certain embodiments of the present disclosure provide an optical imaging apparatus that forms a virtual image while reducing effects of scattered light that has exited the optical imaging apparatus by preventing the scattered light from re-entering the optical imaging apparatus. This can allow clearer virtual images to be formed without the contaminating effects of optical "noise" reducing image quality.

These and other aspects, objects, features and advantages of the present invention will be more clearly understood and appreciated from a review of the following detailed description of the preferred embodiments and appended claims, and by reference to the accompanying drawings.

According to an aspect of the present disclosure, an imaging apparatus for forming a virtual image superimposed within a view of an ambient environment includes a waveguide having first and second surfaces, an in-coupling diffractive optic on one of the first and second surfaces, and out-coupling diffractive optic on one of the first and second surfaces. The in-coupling diffractive optic directs image-bearing light beams of a virtual image into the waveguide for propagation along the waveguide by internal reflections from the first and second surfaces. The out-coupling diffractive optic directs the image-bearing light beams from the waveguide toward a viewer eyebox so that the virtual image is viewable from within the eyebox. An at least partially transparent outer cover protects as least part of the waveguide from undesirable environmental influences of an ambient environment while supporting views of the ambient environment from the eyebox through both the waveguide and the outer cover. A circular polarizer interposed between waveguide and the outer cover blocks a return of stray light into the waveguide as a result of reflections of the stray light from the outer cover.

The circular polarizer can be arranged such that stray light exiting through the front surface of the waveguide propagates through the circular polarizer to the outer cover and at least a portion of the stray light reflected from the outer cover is blocked from reentering the waveguide. The outer cover can be made of a photochromic material, which darkens upon exposure to light of sufficient intensity to reduce an amount of light from the ambient environment reaching the eyebox and thereby preserve a desired contrast of the virtual image from within the eyebox.

In one or more arrangements, the outer cover has a concave shape facing the circular polarizer and an inner surface of the outer cover facing the circular polarizer can be provided with an anti-reflection coating. Similarly, an inner surface of the circular polarizer facing the waveguide can be provided with an anti-reflection coating.

The first and second surfaces of the waveguide can be plane parallel surfaces, and the circular polarizer can include inner and outer plane parallel surfaces through which the stray light from the waveguide passes en route to the outer cover. The plane parallel surfaces of the circular polarizer can be tilted with respect to the plane parallel surfaces of the waveguide to reduce the return of stray light into the waveguide from back reflections of the stray light from the circular polarizer. The waveguide and the outer cover can be supported within an aperture of a common frame, such as an eyeglass frame.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings.

Figure 3C:
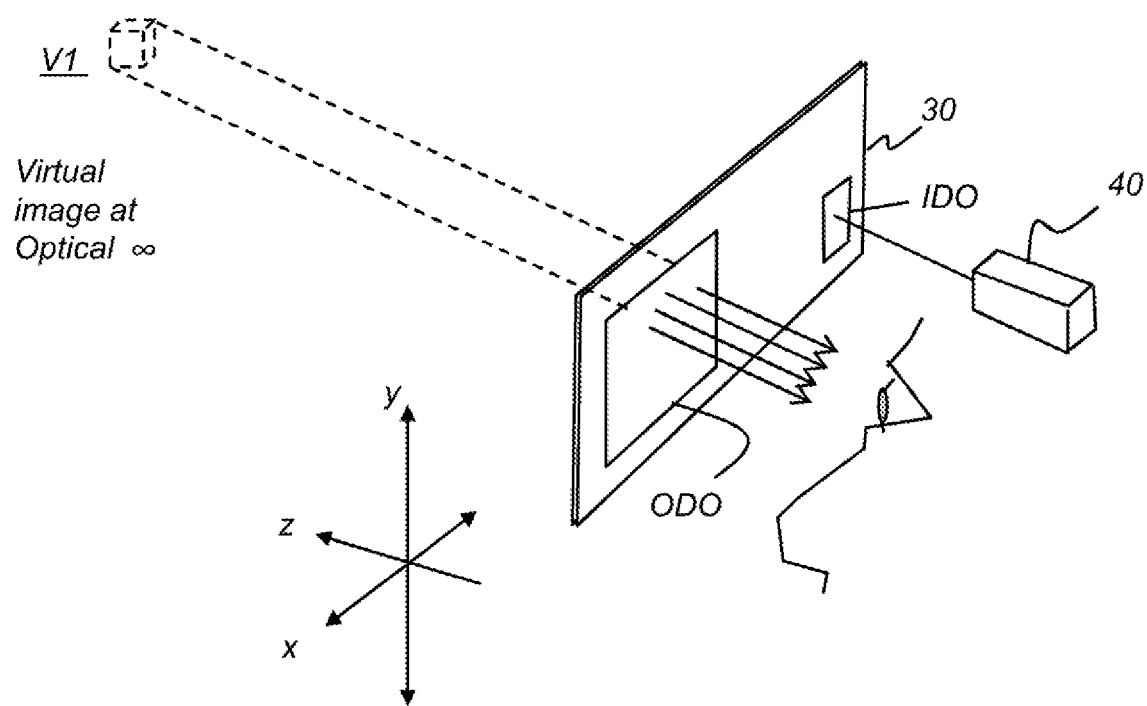

FIGS. 3A, 3B, and 3C are respective side elevational, top elevational, and rear perspective views of an imaging apparatus with an image light guide for forming a virtual image at infinity focus within a viewer's field of view.

Figure 4A:
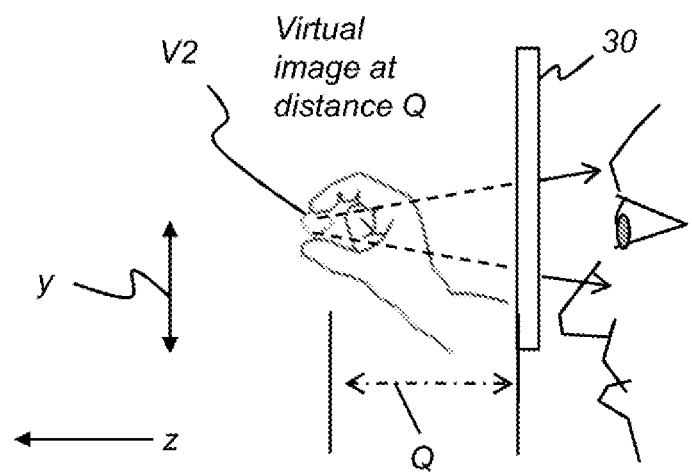
Figure 4B:
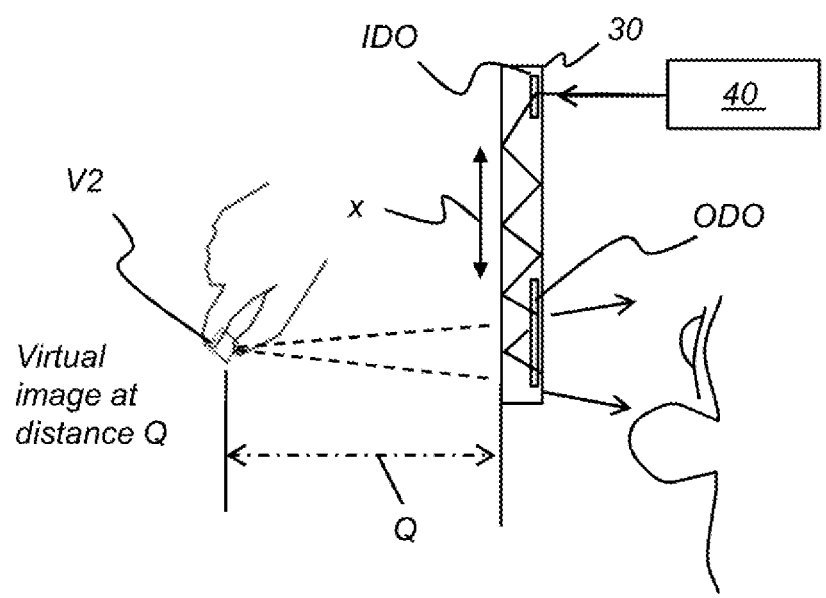
Figure 4C:
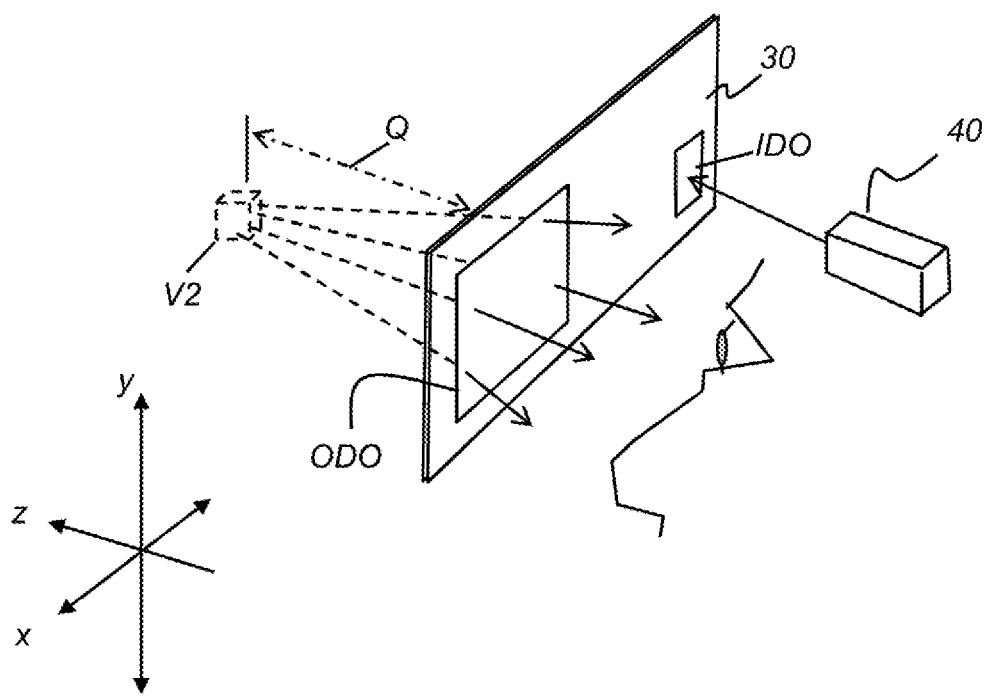

FIGS. 4A, 4B, and 4C are respective side elevational and top elevational views of an imaging apparatus with an image light guide for forming a virtual image at near focus within a viewer's field of view according to an embodiment of the present disclosure.

Figure 5A:
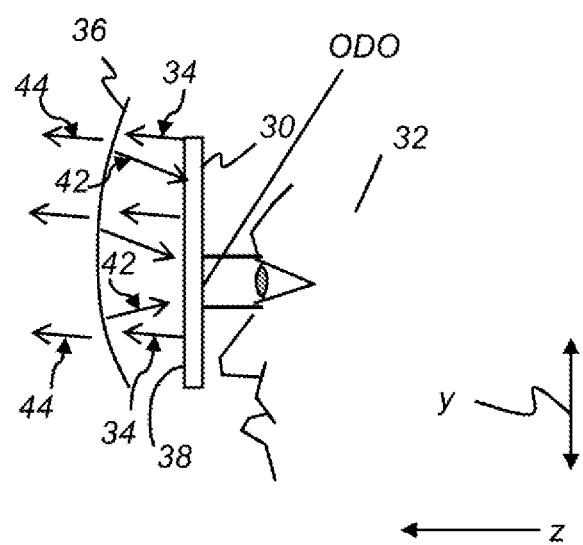
Figure 5B:
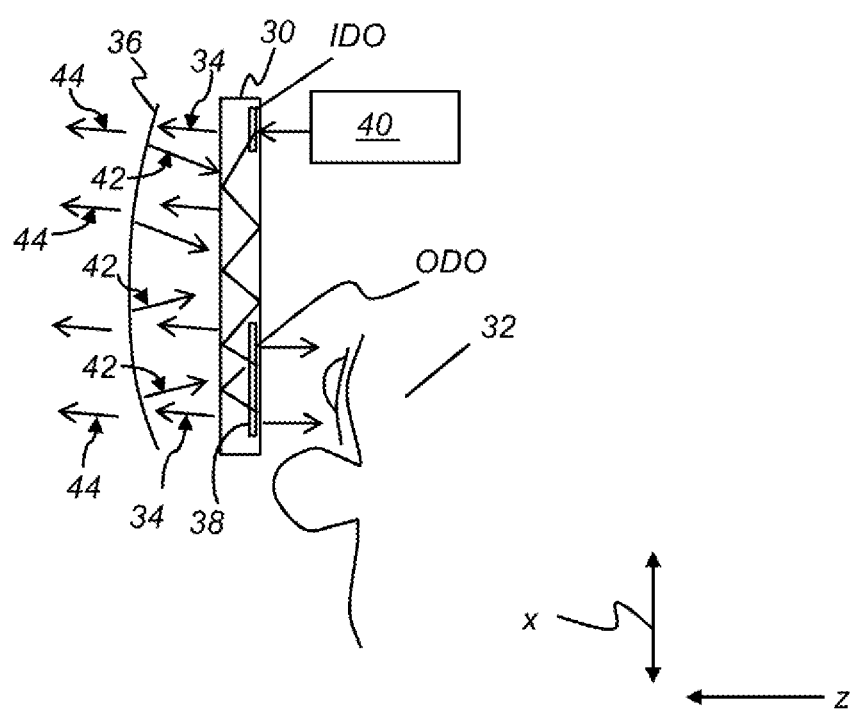

FIGS. 5A and 5B are respective side elevational, top elevational perspective views of an imaging apparatus with an image light guide together with a transparent or semi-transparent outer covering.

Figure 6A:
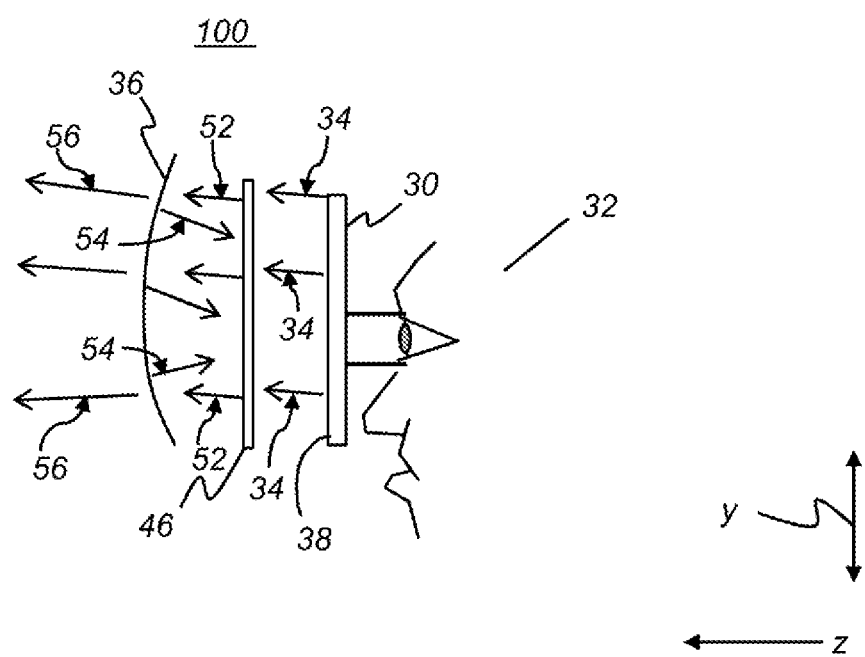
Figure 6B:
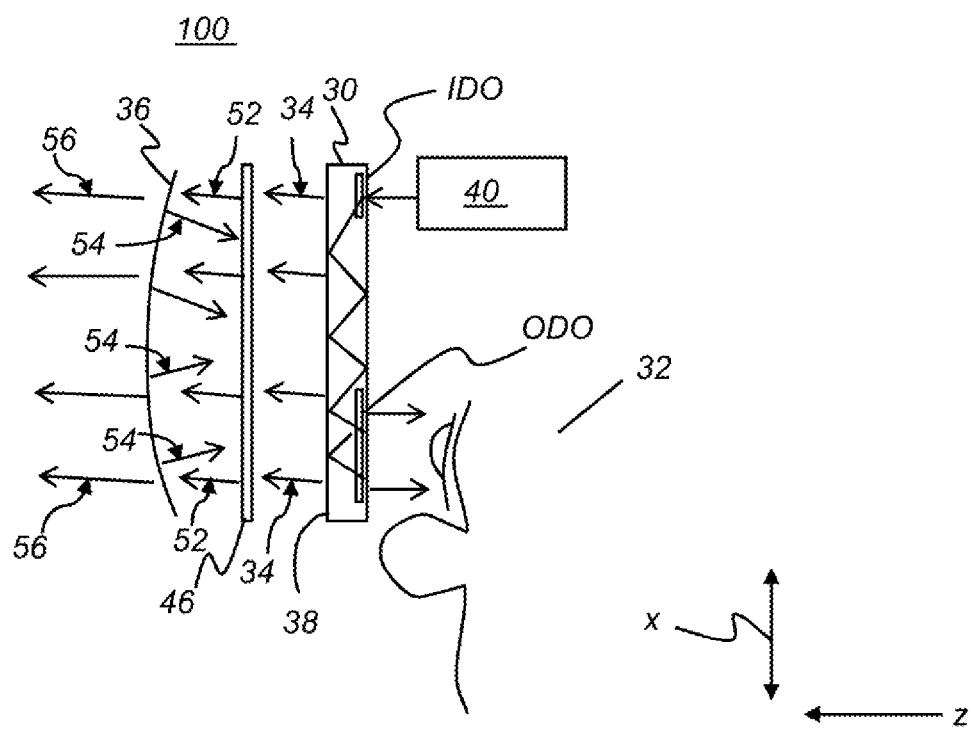

FIGS. 6A and 6B are respective side elevational and top elevational views of an imaging apparatus with an image light guide together with a circular polarizer interposed between the image light guide and an outer covering.

Figure 7:
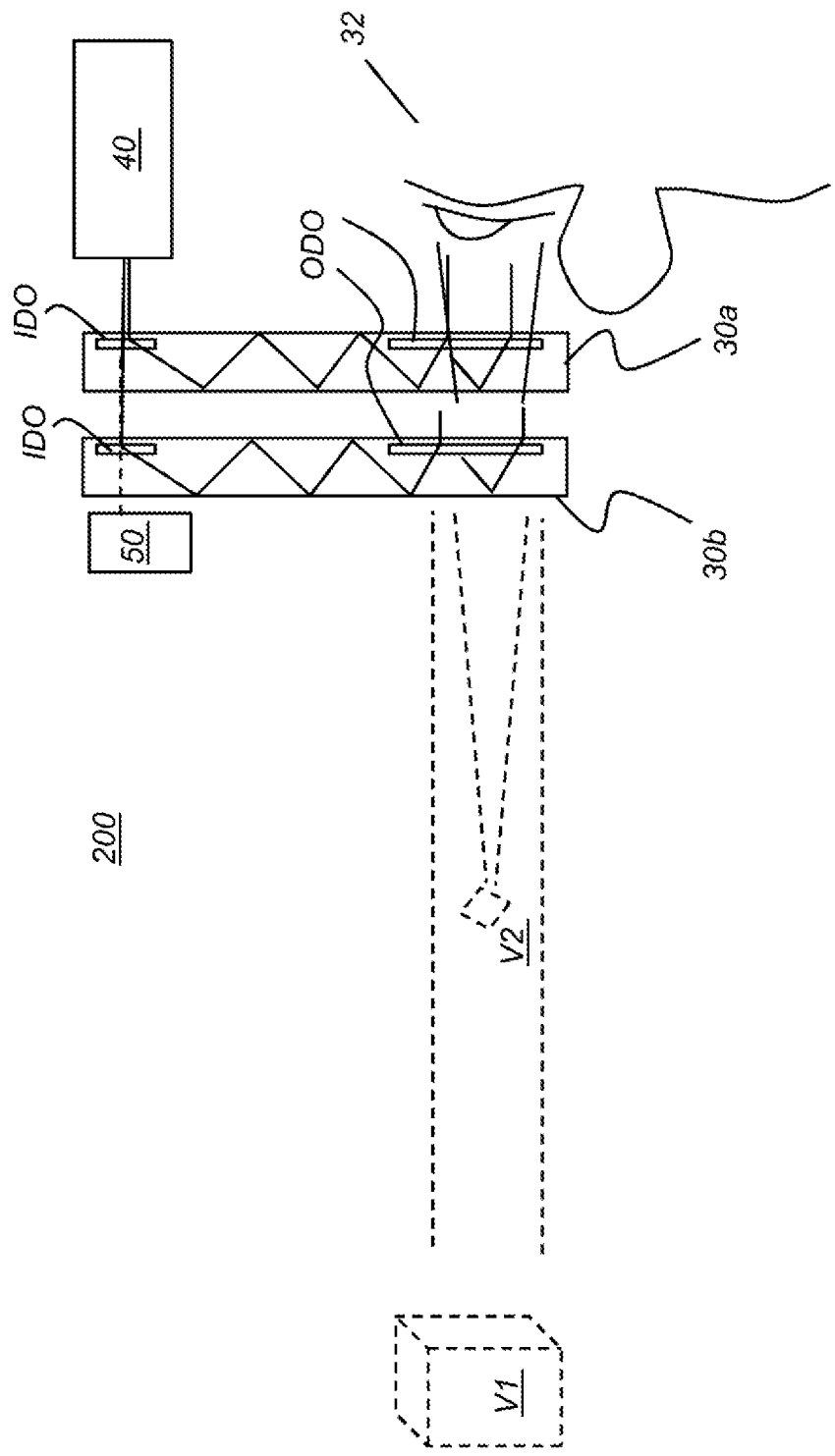

FIG. 7 is a top elevational view of an imaging apparatus with anterior and posterior image light guides for forming virtual images at both an infinity focus and a near focus within a viewer's field of view.

Figure 8:
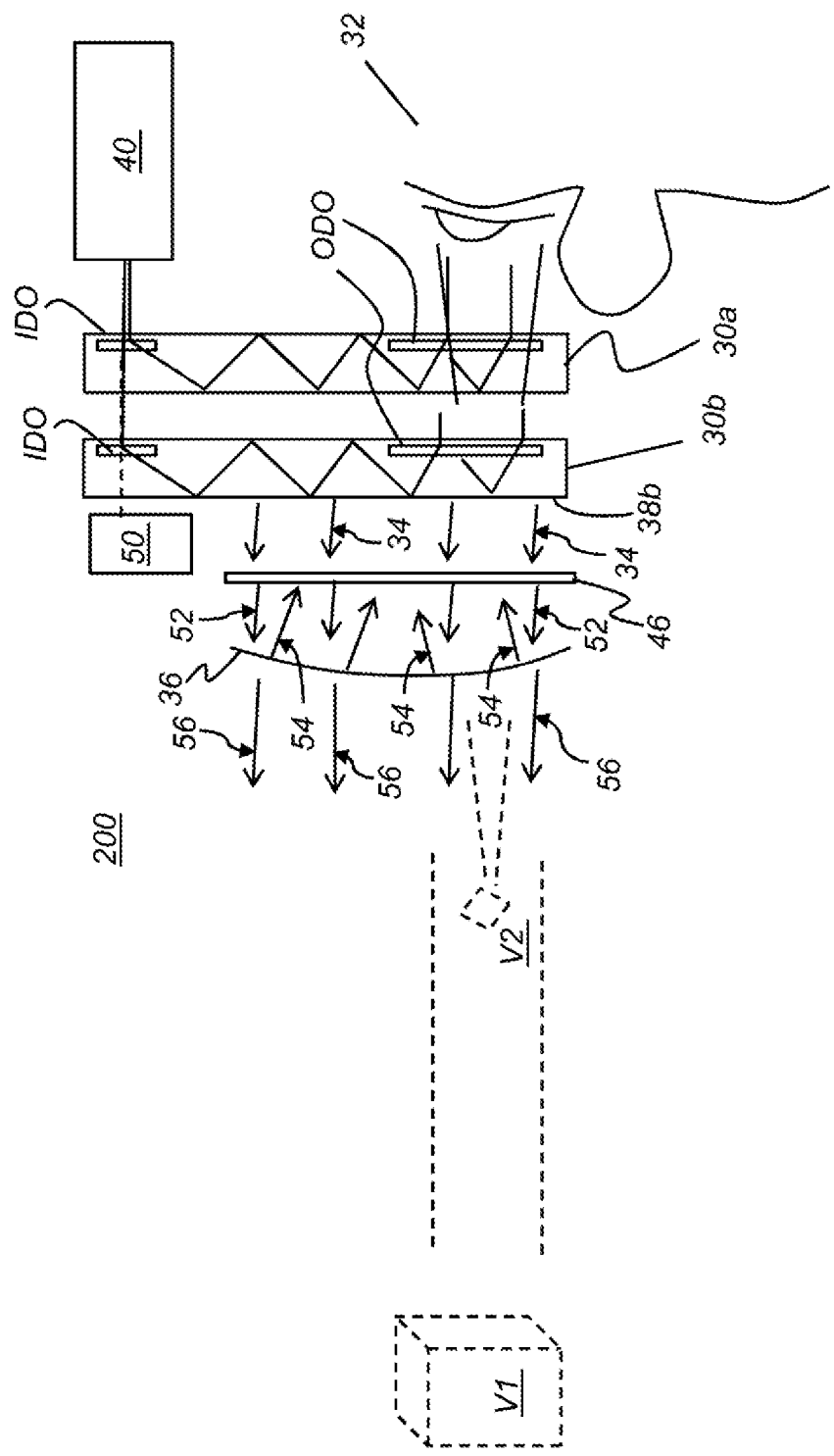

FIG. 8 is top elevational view of the imaging apparatus of FIG. 7 together with a circular polarizer interposed between the anterior image light guide and an outer covering.

Figure 9:
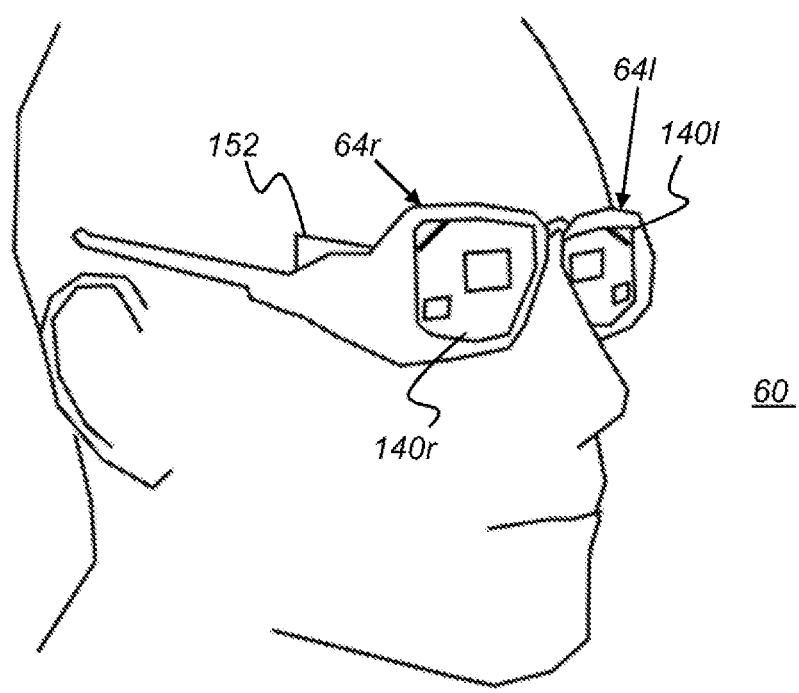

FIG. 9 is a front perspective view of a head-mounted display system for augmented reality viewing using image light guides mounted in an eyeglass frame.

Figure 10:
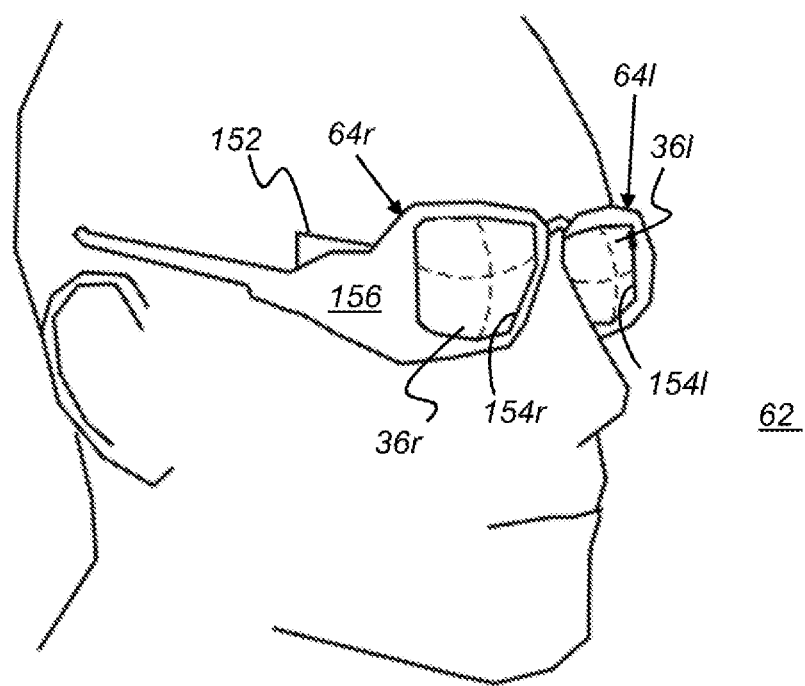

FIG. 10 is a similar front perspective view of the head-mounted display system of FIG. 9 together with outer coverings mounted in the frame over the image light guides.

Figure 11:
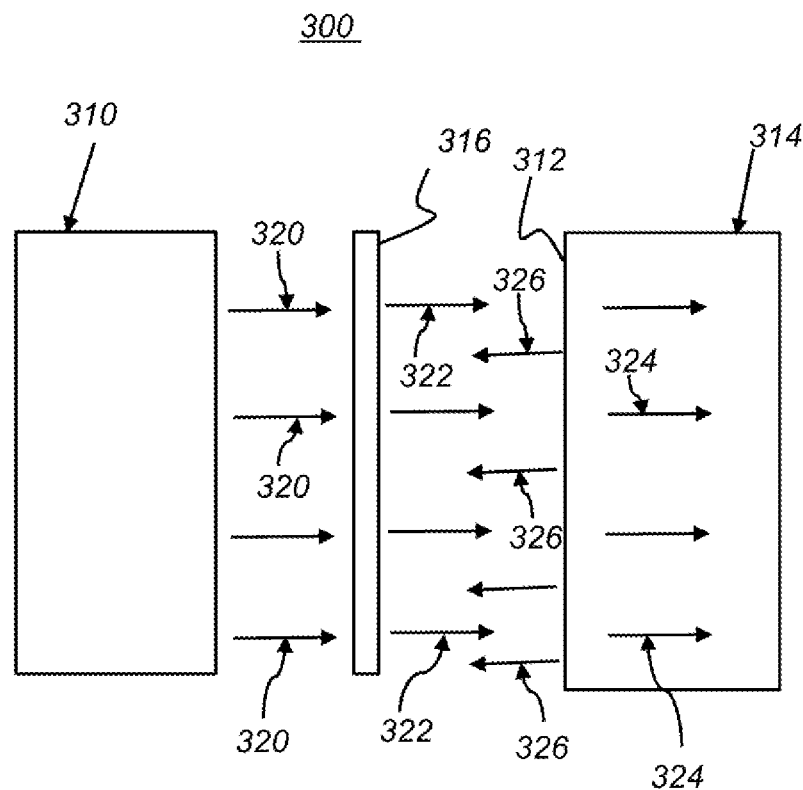

FIG. 11 is a diagram of an optical system having a circular polarizer between two optical subsystems.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are considered to be equivalent and refer to the person who views the virtual images through a near-eye viewing device.

The terms "coupled" or "coupler" in the context of optics refers to a connection by which light travels from one optical medium or device to another optical medium or device through an intermediate structure that facilitates the connection.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality display. For example, the apparent size of a virtual image is not limited by the size or location of a display surface. In comparison with systems that project a real image, a more realistic viewing experience can be provided by forming a virtual image that appears to be some distance away. Providing a virtual image also obviates any need to compensate for screen artifacts, as may be necessary when projecting a real image.

The phrases "optical infinity" and "at infinity" as used herein corresponds to conventional usage in the camera and imaging arts, indicating image formation using substantially collimated light, so that the focus distance exceeds at least about 4 m.

Figure 1:
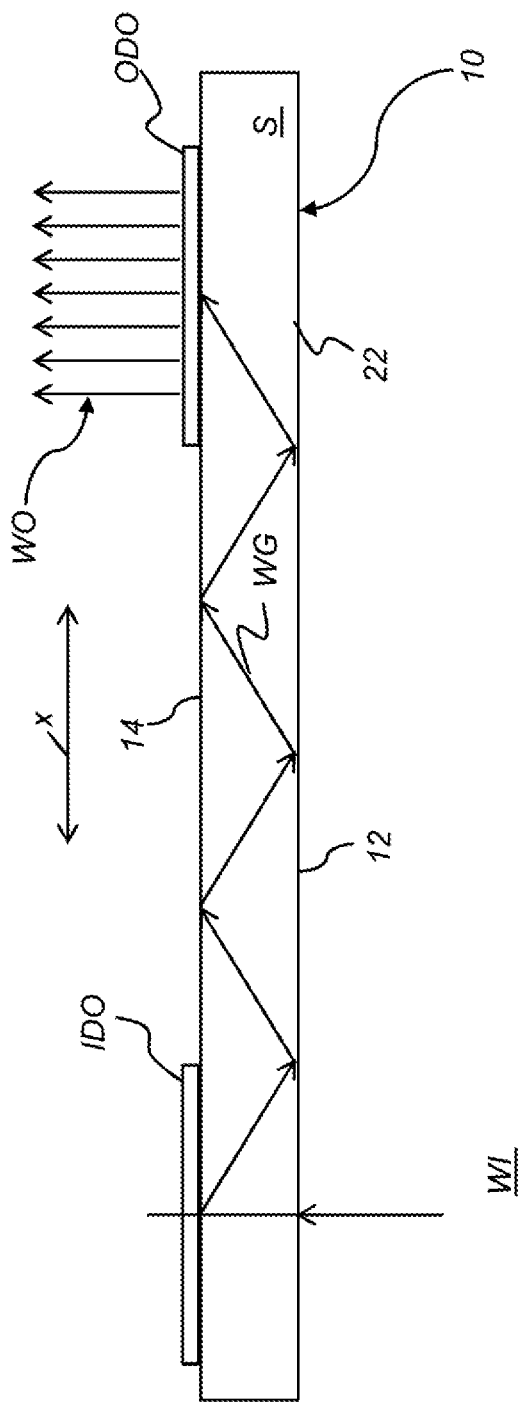
FIG. 1 is a top elevational view of an image light guide having a transparent plate-shaped waveguide, an in-coupling diffractive optic, and out-coupling diffractive optic and showing expansion of a propagating light beam along one dimension.

FIG. 1 a simplified top view of a monocular type image light guide 10 comprising a plate-shaped waveguide 22 having a transparent substrate S and plane-parallel front and back surfaces 12 and 14, an in-coupling diffractive optic IDO, and an out-coupling diffractive optic ODO. In this example, incoming beam WI, which represents one of many angularly related beams required to convey a virtual image, transmits through the front surface 12 of the waveguide 22 and is diffracted by a reflective type in-coupling diffractive optic IDO located on the back surface 14 of the waveguide 22. As such, the in-coupling diffractive optic IDO, which can be arranged as a reflective type diffraction grating, redirects the incoming beam WI into an orientation for further propagation along the waveguide 22 as guided beam WG. The guided beam WG propagates along the depicted x-axis of the waveguide by a mechanism of total internal reflection (TIR) between the plane-parallel front and back surfaces 12 and 14 of the waveguide 22 en route to the out-coupling diffractive optic ODO.

In various other arrangements, the in-coupling diffractive optic IDO can be located on the front or back surface 12 or 14 of the waveguide 22 and can be of a transmissive or reflective type in a combination that depends upon the direction from which the incoming beam WI approaches the planar waveguide 22. For example, the in-coupling diffractive optic IDO could be arranged as a transmissive diffraction grating on the front surface 12 of the waveguide and can take other forms such as a volume hologram or other holographic diffraction element, as well as other types of optical component that diffract the incoming beam WI into an orientation capable of further propagation within and along the waveguide 22.

When the image light guide 10 is used as a part of a virtual display system, the incoming beam WI arises as one of a plurality of angularly related beams from an image source (not shown), and suitable front end optics (not shown) control the approach of the angularly related beams including the incoming beam WI toward the waveguide 22. Upon reaching the in-coupling diffractive optic IDO, the incoming beam WI can be diffracted through a non-zero diffraction order (e.g., a first order) into an orientation that propagates along the waveguide 22 as the guided beam WG toward out-coupling diffractive optic ODO.

The out-coupling diffractive optic ODO provides for diffracting the guided beam WG from the waveguide 22 toward the intended location of a viewer's pupil. Although depicted as a transmissive type grating on the back surface 14 of the waveguide 22, the out-coupling diffractive optic ODO could also be arranged as a reflective type grating on the front surface 12 of the waveguide 22. In addition, the out-coupling diffractive optic ODO can take other forms, similar to the in-coupling diffractive optic IDO.

For purposes of beam expansion, the out-coupling diffractive optic ODO can be arranged to diffract one portion of the guided beam WG through a non-zero diffraction order (e.g., a first order) for directing light from the waveguide 22 and to diffract another portion of the beam WG through a zero diffraction order for further propagating a remaining portion of the guided beam WG along the waveguide 22. After reflecting from the front surface 12 of the waveguide, the remaining portion of the guided beam WG reencounters the out-coupling diffractive optic ODO, where another portion of the guided beam WG is diffracted through the non-zero diffraction order out of the waveguide and a remaining portion of the guided beam WG is diffracted through the zero diffraction order in support of further encounters with the out-coupling diffractive optic ODO along the original direction of propagation. In this way, the guided beam WG is divided into a succession of separately diffracted beam lets, which together comprise an outgoing beam WO that is effectively expanded in the x-axis direction of propagation along the waveguide 22.

The substrate S is depicted as having considerable thickness for ease of illustration but can be made much thinner for purposes including beam expansion to increase the number of reflective encounters of the guided beam WG with the front and back surfaces 12 and 14 of the waveguide 22. Each successive encounter with the out-coupling diffractive optic ODO diffracts another portion of the guided beam WG from the waveguide 22, thereby contributing to the expansion of the outgoing beam WO. The collective expansion of the relatively oriented beams that comprise the virtual image increases the pupil size over which the angularly related beams of the virtual image overlap within an eyebox (not shown).

Figure 2:
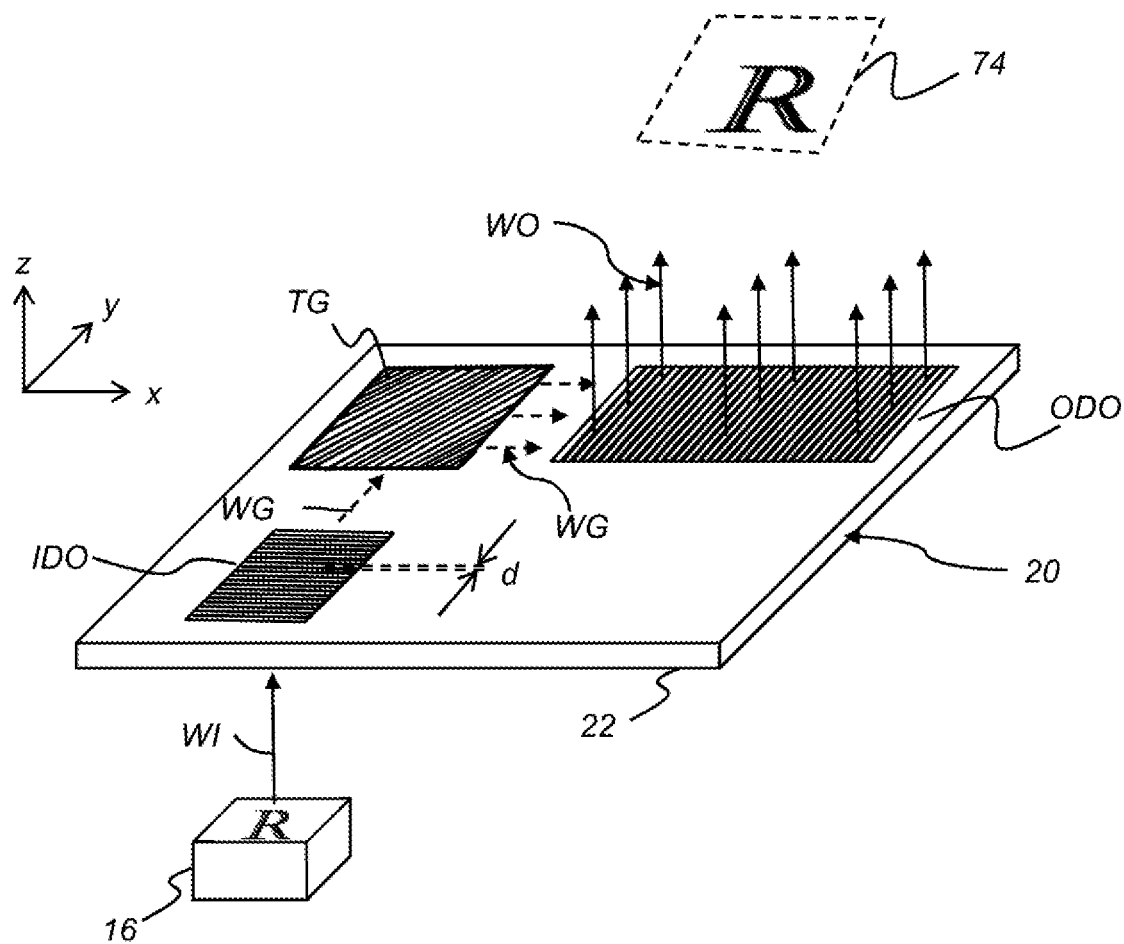
FIG. 2 is a front perspective view an image light guide showing the addition of a turning diffractive optic between the in-coupling and out-coupling diffractive optics for further expanding the propagating light beam along a second of two orthogonal dimensions.

The perspective view of FIG. 2 shows a conventional image light guide 20 arranged as a two-dimensional pupil expander for expanding the outgoing beam WO along both x-axis and y-axis directions along the waveguide 22. In addition to the in-coupling diffractive optic IDO and the out-coupling diffractive optic ODO of the one-dimensional beam expander of FIG. 1, the image light guide 20 includes an intermediate turning diffractive optic TG to progressively redirect light output from the in-coupling diffractive optic toward the out-coupling diffractive optic ODO in an expanded form. The turning diffractive optic TG can be a reflective diffraction grating located on either of the front and back surfaces of the waveguide 22 as well as other types of optical component components capable of redirecting successive portions of beams propagating along the waveguide 22. As a grating, the features of the turning diffractive optic TG can be fashioned in various shapes (e.g., slanted or square) and blazed to concentrated diffracted light in desired orders.

Similar to the image light guide 10 of FIG. 1, the in-coupling diffractive optic IDO of FIG. 2 receives incoming beam WI representing one of a plurality of pixels generated by an image source 16. A full range of angularly encoded beams for producing a virtual image can be generated by a real display together with focusing optics, by a beam scanner for more directly setting the angles of the beams, or by a combination such as a one-dimensional real display used with a scanner.

The image bearing beams WG that enter the waveguide 22 through the in-coupling diffractive optic IDO can be angularly encoded by the mechanism of diffraction in a form that changes the original angular relationships among the image bearing beams WI. Any such encoding of the image bearing beams WG propagating along the waveguide 22 is preferably decoded among the image bearing beams WO exiting from the waveguide 22 through the out-coupling diffractive optic ODO so that the virtual image can be viewed as intended within the eyebox, which is shown schematically as an eyebox 74 in FIG. 2. In this way, the depicted image of the letter "R" produced by the image source 16 can be faithfully reproduced in the virtual image that is viewable within the eyebox 74.

The turning diffractive optic TG, which is placed at an intermediate position between the in-coupling and out-coupling diffractive optics IDO and ODO, is typically arranged so that the turning diffractive optic TG does not induce any change in the encoded light. As such, the design of the out-coupling diffractive optic ODO can mirror the design of the in-coupling diffractive optic, so that any encoding of the angular relationships among the image bearing beams WG introduced by the in-coupling diffractive optic are removed by the out-coupling diffractive optic. For example, the periodic features (e.g., lines or grooves) of the in-coupling diffractive optic can be spaced with a period d that also matches the spacing of corresponding features of the out-coupling diffractive optic.

The period of the turning diffractive optic TG can also be arranged to match the common period of the in-coupling and out-coupling diffractive optics IDO and IDO with the grating features of the turning diffractive optic TG oriented at 60 degrees to the corresponding features of both the in-coupling diffractive optic IDO and the out-coupling diffractive optic ODO. In this arrangement, the grating features of the in-coupling and out-coupling diffractive optics IDO and ODO are also relatively oriented through 60 degrees with respect to each other, and a first diffraction order of the turning diffractive optic TG can be used to turn the guided beams WG by 120 degrees to maintain the same relative orientation of the guided beams WG to both the in-coupling and out-coupling diffractive optics IDO and ODO. This first-order diffraction only acts on the vector component of the guided beams WG that is parallel to the grating vector of the turning diffractive optic TG (i.e., perpendicular to the orientation of the periodic features of the turning diffractive optic TG). As such, the turning diffractive optic TG redirects the guided beams WG within the waveguide 22 without changing the encoded angular information of the virtual image. The resultant virtual image in such a designed system is not rotated with respect to the image directed into the waveguide 22.

The turning diffractive optic TG provides for expanding the guided beams WG in a y-axis direction in a fashion similar to the beam expansion of the out-coupling diffractive optic ODO in the x-axis direction. However, instead of using a non-zero diffraction order (e.g., a first diffraction order) to diffract portions of the guided beams out of the waveguide 22, the turning diffractive optic TG uses a non-zero diffraction order (e.g., a first diffraction order) to reorient portions of the guided beams WG within the waveguide along a path of propagation toward the out-coupling diffractive optic ODO. Remaining portions of the light energy of the guided beams WG are diffracted through a zero diffraction order to support further encounters of the guided beams WG with the turning diffractive optic TG in the original direction of propagation. The resulting succession of offset beamlets approaching the out-coupling diffractive optic effectively expand the guided beams WG in the y-axis direction, which is understood to be normal to the direction at which the guided beams are turned for approaching the out-coupling diffractive optic ODO. The further propagation of the expanded guided beams WG through multiple encounters with the out-coupling diffractive optic expands the guided beams is a second dimension along the x-axis of the waveguide 22.

The conventional image light guides 10 and 20 of FIGS. 1 and 2 can be used in a number of existing head-mounted device (HMD) designs for providing image content to a viewer. In addition, such image light guides 10 and 20 are particularly well-suited to augmented reality applications in which the image content can be superimposed on a real-world view as seen through the transparent substrates S of the image light guides.

As shown in FIGS. 3A, 3B, and 3C, a conventional virtual imaging system with an image light guide 30 typically forms a virtual image V1 from angularly related beams of generally collimated light, so that the virtual image V1 is formed at optical infinity focus. A beam indicated in solid lines represents the transmission of a single pixel from an image source 40 through the image light guide 30 to the eye of a viewer as a beam in an expanded form. Dashed lines indicate the apparent position of the pixel in the virtual image at the optical infinity focus.

FIGS. 4A, 4B, and 4C, depict a virtual imaging system with a modified image light guide 30 for converting a collimated beam into an expanded and diverging beam approaching a viewer's eye. The dashed rays represent the apparent position of the pixel in the virtual image V2 at a near-focus distance Q. Such a near or finite focal distance Q can be at any distance within about 1 m to 2 m, such as at about 0.6 m from the image light guide 30, for example. The focal distance can be shortened by adding optical power so that each of the collimated angularly related beams diverges from the image light guide 30 and appears to emanate from a point in the virtual image V2 at the finite focal distance Q. The optical power can be added by appending another optic using the mechanism of refraction or diffraction or by reshaping the features of the out-coupling diffractive optic so that the diffraction angles of the diffractive optic vary with distance from center.

FIGS. 5A and 5B depict a virtual imaging system with the image light guide 30 combined with a transparent or semi-transparent outer cover 36 for protecting the image light guide and its intended operation against environmental hazards. As shown, the outer cover 36 has a concave shape (from the viewer's point of view) and is positioned over at least a portion of the image light guide 30 remote from a viewer 32. While the outer cover 36 can be made of an at least partially transparent material such as a conventional optical glass or plastic to provide a physical barrier to environmental conditions, the outer cover could also be made of a photochromic material, which darkens upon exposure to specific types of light of sufficient intensity such as ultraviolet (UV) radiation. Such darkening can preserve the contrast of virtual images superimposed upon the environmental field of view of the viewer. In the absence of activating light, the photochromic material can return to a clear state (i.e., a more transparent state), where ambient lighting conditions do not overwhelm the desired contrast of virtual images that are also conveyed to the viewer's eye. Photochromic lenses can be made of glass, polycarbonate, or another plastic and are generally treated to darken in bright sunlight, but clear in low ambient light conditions. In another embodiment, the outer cover could be essentially flat.

Light within the image light guide 30 of FIGS. 5A and 5B propagates by total internal reflection (TIR) along its waveguide from the in-coupling diffractive optic IDO to the out-coupling diffractive optic ODO. However, some of the propagating light can become stray light by (a) scattering from imperfections in or on the waveguide, (b) diffracting at unwanted angles from the in-coupling and out-coupling diffractive optics IDO and ODO or other discontinuous structures along the waveguide or (c) reflecting from a peripheral boundary of the waveguide. Some of this scattered, diffracted, and reflected light violates the TIR conditions required to maintain the light within the waveguide and can escape from the waveguide as stray light. In fact, any of the light intended to contribute to the virtual image that escapes instead through a front surface 38 of the image light guide 30 can be considered as stray light.

The stray light 34 that escapes through the front surface 38 of the image light guide 30 propagates in the general direction of the outer cover 36, where a portion of the stray light 34 reflects from the outer 36 to become reflected stray light 42. Another portion of stray light 34 passes through the cover 36 as transmitted light 44. Some of the reflected stray light 42 reenters the image light guide 30 and propagates to the out-coupling diffractive optic ODO, where the stray light can mix with the light intended to form the virtual image that is viewable by the viewer 32. Such stray light reaching the viewer 32 can produce undesirable visual imaging effects and degrade the virtual image seen by the viewer 32. Thus, while the outer cover 36 can provide a physical barrier to ambient environmental hazards and can be further arranged to compensate for ambient lighting conditions that would otherwise degrade the contrast of virtual images superimposed on such lighted environments, the reflective properties of such outer covers can contribute to other unintended consequences that could also degrade the quality of the virtual images intended to be conveyed to viewers.

To minimize reflections of the stray light 42 from the outer cover 36, an anti-reflection coating can be applied to the outer cover 36. However, a more robust solution would be desirable.

FIGS. 6A and 6B depict a virtual image forming optical system 100 with a circular polarizer 46 positioned between the image light guide 30 and the cover 36. The circular polarizer 46 can be a conventional circular polarizing filter of the type used to create circularly polarized light and to block light of the opposite circular polarization. For example, a right-handed circular polarizer can be used to block left-handed circularly polarized light, and a left-handed circular polarizer can be used to block right-handed circularly polarized light. The circular polarizer 46 can be arranged to include an anti-reflection coating on its inner surface closest to the viewer's eye. As shown, the circular polarizer 46 has a plate shape with plane parallel inner and outer surfaces and is positioned parallel to an essentially planar front surface 38 of the image light guide 30. Alternatively, the circular polarizer 46 can be tilted with respect to the front surface 38 of the image light guide 30 for reflecting at least a portion of the light reaching the circular polarizer 46 away from the image light guide 30. In another of its possible arrangements, the circular polarizer 46 can be supported by the image light guide 30 such that the TIR condition of the image light guide 30 is not significantly altered by the presence and proximity of the circular polarizer 46. For example, the circular polarizer 46 can be positioned in at least in partial contact with, but not adhered to the waveguide in a position required to support the desired propagation of the image-bearing light beams along the waveguide.

The stray light 34 that leaves the image light guide 30 through its front surface 38 passes through the interposed circular polarizer 46 to become circularly polarized light 52. Upon interaction with the outer cover 36, a portion of circularly polarized light 52 passes through the outer cover 36 to become transmitted light 56 while another portion of circularly polarized light 52 reflects from the outer cover 36 to become reflected circularly polarized light 54 of an opposite rotational orientation. As is known to those skilled in the art, circularly polarized light of one rotational orientation (clockwise or counter-clockwise) becomes circularly polarized light of the opposite rotational orientation (counter-clockwise or clockwise) upon reflection. The reflected circularly polarized light 54 of an opposite rotational orientation returning to the circular polarizer 46 is blocked by the circular polarizer 46 from reaching the image light guide 30. In this way, stray light emitted from the front surface 38 of the image light guide 30 and reflected by the outer cover 36 is prevented from re-entering the image light guide 30. Thus, the circular polarizer 46 interposed between the image light guide 30 and the outer cover 36 reduces the undesirable effects of scattered light that would otherwise return to the image light guide 30 from the outer cover 36 and degrade the virtual image formed by the virtual image forming optical system 100.

FIG. 7 depicts a dual imaging apparatus 200 combining a first image light guide 30a with a second image light guide 30b for forming both a virtual image V1 at infinity focus and a virtual image V2 at a near-focus position using an ODO. A beam separator 50 can be used to direct the appropriate scene content for infinity- and near-focused images, using mechanisms such as polarization, shuttering, or other characteristic to select the appropriate light for each of the image light guides 30a and 30b. Alternatively, the two image light guides 30a and 30b together with their respective outcoupling optics ODOs can be arranged to produce virtual images at two different finite focal lengths, i.e., where neither focal length is considered at optical infinity.

FIG. 8 is a top-down view of the dual imaging apparatus 200 of FIG. 7 further comprising an outer cover 36 and a circular polarizer 46 that is positioned between the front surface 38b of the image light guide 30b and the outer cover 36. An anti-reflection coating can be applied to an inner surface of the outer cover 36 to reduce back reflections of scattered light toward the image light guide 30b. Alternatively or additionally, the circular polarizer 46 can include an anti-reflection coating on its surface closest to viewer 32. For similar purposes, the circular polarizer 46 can be tilted with respect to the front surface 38b of image light guide 30b.

The circular polarizer 46 can be arranged to be removable from the space between the image light guide 30b and the outer cover 36 for purposes of substitution or selective use. Alternatively, the circular polarizer can be fixed to the front surface 38b of the image light guide 30b or arranged partially in contact with the image light guide 30b in such a way as to not significantly alter the TIR properties of the image light guide 30b.

The perspective view of FIG. 9 shows a display system 60 for three-dimensional (3-D) augmented reality viewing using a pair of image light guides of the present disclosure. Display system 60 is shown as an HMD with a left-eye optical system 64l having an image light guide 140l for the left eye and a corresponding right-eye optical system 64r having an image light guide 140r for the right eye. An image source 152, such as a picoprojector or similar device, generates a separate image for each eye, which are separately conveyed to the viewer's two eyes by the image light guides 140l and 140r as virtual images. The images that are generated can be a stereoscopic pair of images for 3-D viewing. The virtual images conveyed to the viewer's eyes can be superimposed or overlaid onto a real-world scene that remains accessible to the viewer through the image light guides 140l and 140r. Additional components familiar to those skilled in the augmented reality visualization arts can be incorporated into the HMD, such as one or more cameras mounted on the frame of the HMD for viewing scene content or viewer gaze tracking. Alternative arrangements are possible, including a display apparatus for providing overlapping virtual and real-world images to just one eye of the viewer.

The perspective view of FIG. 10 shows a display system 62 for three-dimensional (3-D) augmented reality viewing using a pair of image light guides, outer covers 36r and 36l and circular polarizers (not shown, but see FIG. 8) interposed between the image light guides and the outer covers 36r and 36l. Display system 62 is shown as an HMD with a left-eye optical system 64l having an image light guide (not shown, but see FIG. 9) for the left eye and a corresponding right-eye optical system 64r having an image light guide (not shown, but see FIG. 9) for the right eye. The respective image light guides, circular polarizers and the outer covers 36r and 36l are all mounted within respective apertures 154r and 154l of the depicted frame 156. An image source 152, such as a picoprojector or similar device also mounted on the frame 156 generates separate images for each eye, which are separately conveyed by the image light guides to the two eyes of the viewer as virtual images in a desired orientation. The images that are generated can be a stereoscopic pair of images for 3-D viewing. Also similar to the HMD of FIG. 9, the virtual images conveyed to the viewer's eyes can be superimposed or overlaid onto a real-world scene that remains accessible to the viewer through the image light guides 140l and 140r. Additional components familiar to those skilled in the augmented reality visualization arts can be incorporated into the HMD, such as one or more cameras mounted on the frame of the HMD for viewing scene content or viewer gaze tracking. Alternative arrangements are possible, including a display apparatus for providing overlapping virtual and real-world images to just one eye of the viewer.

FIG. 11 is a simplified sketch of an optical system 300 with two optical subsystems 310 and 314, at least one of which preferably takes the form of an image light guide. For example, the optical subsystem 310 is arranged such that a first portion of image bearing light is conveyed to a position at which a virtual image can be seen and a second portion of the image bearing light escapes from the first optical subsystem as stray light. The optical system 300 further comprises a circular polarizer 316 interposed between optical subsystem 310 and optical subsystem 314. A portion of the referenced stray light 320 from optical subsystem 310 passes through circular polarizer 316 to become circularly polarized light 322 that impinges on a partially reflective surface 312 of optical subsystem 314, which, for example could be constructed as an outer cover of an imaging system that provides a view of the ambient environment. One portion of the circularly polarized light 322 transmits through the partially reflective surface 312 into the optical subsystem 314 as transmitted light 324. Another portion of the circularly polarized light 322 reflects from the partially reflective surface 312 as reflected circularly polarized light 326 having an opposite circular polarization to that of circular polarized light 322. The circular polarizer 316 blocks the reflected circularly polarized light 326 of an opposite circular polarization from further propagation toward the optical subsystem 310. In this way, the stray light 320 emitted from optical subsystem 310 reaches the optical subsystem 314 through the circular polarizer 316 but is prevented from returning to the optical subsystem 310 as a result of reflections from the optical subsystem 314.

The circular polarizer 316 can be provided with an anti-reflection coating on its surface closest to optical subsystem 310 to avoid the unintended return of light from the circular polarizer 316. For similar purposes, the circular polarizer 316 can be tilted with respect to optical subsystem 310. The circular polarizer 316 could also be mounted in contact with at least a portion of either or both optical subsystems 310 and 314. For various purposes including substitution of different circular polarizers or other optical components or the selective use of the circular polarizer 316 in limited situations, the circular polarizer can be arranged to be removable and replaceable from the space between the optical subsystems 310 and 314.

The optical subsystem 314 could also be arranged as a second image light guide such that a first portion of image bearing light is conveyed by the second image light guide to a position at which a virtual image can be seen and a second portion of the image bearing light conveyed by the second image light guide escapes from the first optical subsystem as stray light. The circular polarizer 316 permits this stray light to reach the optical subsystem 310 as a first image light guide but blocks the stray light reflected from the first image light guide from returning to the second image light guide. Thus, stray light from either of the first and second image light guides can reach the other of the first and second image light guides but is blocked from returning to the light guide from which the stray light first escaped. Both image light guides preferably include in-coupling and out-coupling optics for directing the first portions of the image bearing light to the position at which the virtual image and the ambient environment can be seen. In addition to controlling stray light in this way, a similar arrangement of a circular polarizer between two image light guides can support desired one-way transmissions of image bearing beams between the image light guides.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An imaging apparatus for forming a virtual image, comprising:
    a waveguide having first and second surfaces;
    an in-coupling diffractive optic arranged along one of the first and second surfaces, wherein the in-coupling diffractive optic is operable to direct image-bearing light beams into the waveguide, wherein the waveguide is operable to propagate the image-bearing light beams along the waveguide by internal reflections from the first and second surfaces;
    an out-coupling diffractive optic arranged along one of the first and second surfaces of the waveguide, wherein the out-coupling diffractive optic is operable to direct at least a portion of the image-bearing light beams from the waveguide through the second surface toward an eyebox;
    an at least partially transparent outer cover located adjacent to the first surface; and
    a circular polarizer arranged between the waveguide and the outer cover, wherein the circular polarizer is operable to prevent at least a portion of image-bearing light beams transmitted through the first surface from reentering the waveguide as a result of reflection from the outer cover;
    wherein a planar surface of the circular polarizer is tilted with respect to the first surface, whereby the circular polarizer is operable to reduce reflections of the light transmitted through the first surface from the circular polarizer reentering the waveguide.

2. The imaging apparatus of claim 1, wherein the circular polarizer is arranged such that the at least a portion of image-bearing light transmitted through the first surface of the waveguide propagates through the circular polarizer and is circularly polarized to a first rotational orientation, and wherein the circularly polarized light of the first rotational orientation is reflected from the outer cover as circularly polarized light of a second rotational orientation opposite the first rotational orientation.

3. The imaging apparatus of claim 1, wherein the outer cover comprises a photochromic material, wherein the outer cover is operable to reduce an amount of light from an ambient environment reaching the eyebox.

4. The imaging apparatus of claim 1, wherein the outer cover comprises a concave surface adjacent to the circular polarizer.

5. The imaging apparatus of claim 1, wherein the outer cover includes an inner surface adjacent to the circular polarizer, and wherein the inner surface of the outer cover includes an anti-reflection coating.

6. The imaging apparatus of claim 1, wherein the planar surface of the circular polarizer includes an anti-reflection coating.

7. The imaging apparatus of claim 1, wherein the first and second surfaces of the waveguide are plane parallel surfaces, and the circular polarizer includes inner and outer plane parallel surfaces through which the light transmitted through the first surface propagates to the outer cover.

8. The imaging apparatus of claim 1, wherein the waveguide and the outer cover are supported within an aperture of a common frame.

9. An imaging apparatus for forming a virtual image, comprising:
    an image light guide having first and second surfaces, an in-coupling diffractive optic arranged along one of the first and second surfaces, and an out-coupling diffractive optic arranged along one of the first and second surfaces;

the in-coupling diffractive optic being arranged to diffract image-bearing light beams into the image light guide, wherein at least a portion of the image-bearing light beams propagate to the out-coupling diffractive optic by internal reflections from the first and second surfaces;

the out-coupling diffractive optic being arranged to diffract the image-bearing light beams through the second surface of the image light guide toward an eyebox, whereby a virtual image is viewable from within the eyebox;

an at least partially transparent outer cover operable to protect at least part of the image light guide from environmental influences while supporting views of an environment through both the image light guide and the outer cover; and a circular polarizer arranged between the image light guide and the outer cover such that image-bearing light beams exiting through the first surface of the image light guide propagate through the circular polarizer to the outer cover and at least a portion of the image-bearing light beams exiting through the first surface are prevented from reentering the image light guide;

wherein a planar surface of the circular polarizer is tilted with respect to the first surface of the image light guide, whereby the circular polarizer is operable to reduce reflections from the circular polarizer from reentering the image light guide.

10. The imaging apparatus of claim 9, wherein the circular polarizer is supported by the image light guide such that the circular polarizer does not significantly interfere with the internal reflections along the image light guide.

11. The imaging apparatus of claim 9, wherein the image light guide and the outer cover are supported within an aperture of a common frame.

12. The imaging apparatus of claim 9, wherein the outer cover comprises a photochromic material, wherein the outer cover is operable to reduce an amount of light from the environment reaching the eyebox.

13. The imaging apparatus of claim 9, wherein the outer cover comprises a concave surface adjacent to the circular polarizer.

14. The imaging apparatus of claim 9, wherein the outer cover includes an inner surface adjacent to the circular polarizer, and wherein the inner surface of the outer cover includes an anti-reflection coating.

15. The imaging apparatus of claim 9, wherein the planar surface of the circular polarizer is arranged adjacent to the image light guide, and wherein the planar surface of the circular polarizer includes an anti-reflection coating.

16. The imaging apparatus of claim 9, wherein the first and second surfaces of the image light guide are plane parallel surfaces, and the circular polarizer includes inner and outer plane parallel surfaces through which the light exiting through the first surface propagates to the outer cover.

17. An imaging apparatus for forming a virtual image, comprising:

first and second optical subsystems;

the first optical subsystem comprising an image light guide including an in-coupling diffractive optic and an out-coupling diffractive optic arranged to convey a first portion of image bearing light to an eyebox;

wherein a second portion of image bearing light escapes from the first optical subsystem;

the second optical subsystem comprising a partially reflective surface operable to reflect at least a portion of the second portion of image bearing light back toward the first optical subsystem as reflected light;

a circular polarizer arranged between the first and second optical subsystems to transmit a portion of the second portion of image bearing light to the partially reflective surface and to prevent at least a portion of the reflected light from reentering the first optical subsystem;

wherein a planar surface of the circular polarizer is tilted with respect to a surface of the first optical subsystem, whereby the circular polarizer is operable to reduce reflections of the second portion of image bearing light from the planar surface of the circular polarizer from reentering the first optical subsystem.

18. The imaging apparatus of claim 17, wherein the image light guide of the first optical subsystem is a first image light guide, and wherein the second optical subsystem comprises a second image light guide including in-coupling and out-coupling optics configured to direct a third portion of image bearing light to the eyebox.

* * * * *